United States Patent
Inaba et al.

(10) Patent No.: US 9,571,673 B2
(45) Date of Patent: Feb. 14, 2017

(54) IMAGE FORMING APPARATUS WITH CONTROLLED ACTIVATION BASED ON PORT NUMBER AND CONTROL METHOD THEREOF

(75) Inventors: Keishi Inaba, Yokohama (JP); Koji Shimizu, Tokyo (JP); Kohei Asano, Yokohama (JP); Kiyokazu Umimura, Kawasaki (JP); Yuji Naya, Kawasaki (JP); Yuichi Konosu, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 13/446,035

(22) Filed: Apr. 13, 2012

(65) Prior Publication Data

US 2012/0262751 A1 Oct. 18, 2012

(30) Foreign Application Priority Data

Apr. 13, 2011 (JP) ................................. 2011-089537

(51) Int. Cl.
*G06K 15/02* (2006.01)
*H04N 1/00* (2006.01)

(52) U.S. Cl.
CPC ...... *H04N 1/00204* (2013.01); *H04N 1/00896* (2013.01); *H04N 1/00928* (2013.01);
(Continued)

(58) Field of Classification Search
CPC ............ H04N 1/00204; H04N 1/00896; H04N 1/00928; H04N 2201/0074; H04N 2201/0094
(Continued)

(56) References Cited

U.S. PATENT DOCUMENTS 5,485,245 A * 1/1996 Kobayashi ....... G03G 15/04018
358/296
6,321,046 B1 * 11/2001 Kikuchi ................. G03G 15/20
219/216
(Continued)

FOREIGN PATENT DOCUMENTS

CN 100517095 C 7/2009
JP 2003186357 A 7/2003
(Continued)

OTHER PUBLICATIONS

Chinese Office Action cited in Chinese counterpart application No. CN2012101098703, dated Jul. 2, 2014. English translation provided.
(Continued)

*Primary Examiner* — Tammy Paige Goddard
*Assistant Examiner* — Edwin S Leland, III
(74) *Attorney, Agent, or Firm* — Rossi, Kimms & McDowell LLP (57) ABSTRACT

An image forming apparatus equipped with a sleep function and for forming an image using an image forming unit and a control method thereof. The image forming apparatus includes a control unit that controls the image forming unit. When a job is received in a sleep state, a port number of the received job is discriminated, whether or not to perform initialization processing of the image forming unit is determined based on the discriminated port number, and in a case that it is determined that initialization processing of the image forming unit is necessary, initialization processing of the image forming unit is started and thereafter the control unit is controlled to start processing of the job.

14 Claims, 4 Drawing Sheets

(52) U.S. Cl.
   CPC ............... *H04N 2201/0074* (2013.01); *H04N 2201/0094* (2013.01)

(58) Field of Classification Search
   USPC .............................. 358/1.13–1.15; 713/323
   See application file for complete search history.

(56) References Cited

U.S. PATENT DOCUMENTS

| | | | | |
|---|---|---|---|---|
| 7,428,391 | B2* | 9/2008 | Kobayashi | G03G 15/5004 399/88 |
| 2002/0154333 | A1* | 10/2002 | Akashi | G06F 21/608 358/1.15 |
| 2003/0002077 | A1* | 1/2003 | Shima | G06F 3/1222 358/1.15 |
| 2005/0128515 | A1* | 6/2005 | Ohno | H04N 1/00204 358/1.15 |
| 2005/0248803 | A1* | 11/2005 | Ohara | G06F 3/1209 358/1.15 |
| 2006/0028670 | A1* | 2/2006 | Amano | G06F 3/1204 358/1.13 |
| 2006/0039373 | A1* | 2/2006 | Nakamura | H04L 12/12 370/389 |
| 2006/0236143 | A1* | 10/2006 | Kidoguchi | G06F 1/325 713/320 |
| 2006/0274370 | A1* | 12/2006 | Shima | G06F 3/1204 358/1.15 |
| 2008/0002232 | A1 | 1/2008 | Mori | |
| 2008/0133808 | A1* | 6/2008 | Fukunaga | G06F 13/426 710/106 |
| 2008/0201594 | A1* | 8/2008 | Narushima | G06F 1/266 713/324 |
| 2008/0231882 | A1* | 9/2008 | Fuchigami | H04N 1/00204 358/1.15 |
| 2009/0073481 | A1* | 3/2009 | Ferlitsch | H04N 1/00896 358/1.14 |
| 2009/0144573 | A1* | 6/2009 | Ohhashi | G03G 15/5004 713/323 |
| 2009/0244588 | A1* | 10/2009 | Kuroishi | G03G 15/5004 358/1.14 |
| 2010/0188685 | A1* | 7/2010 | Furukawa | G06F 1/3209 358/1.14 |
| 2010/0220355 | A1* | 9/2010 | Sugiyama | G06F 3/1203 358/1.15 |
| 2010/0231966 | A1* | 9/2010 | Todaka | G06F 1/3203 358/1.15 |
| 2010/0315682 | A1* | 12/2010 | Nakamura | H04L 12/12 358/1.15 |
| 2011/0060929 | A1* | 3/2011 | Park | G06F 1/3209 713/323 |
| 2011/0109931 | A1* | 5/2011 | Nomura | H04N 1/0097 358/1.13 |
| 2011/0126036 | A1* | 5/2011 | Hayakawa | G03G 15/5004 713/323 |
| 2011/0128571 | A1* | 6/2011 | Abe | G06F 3/1206 358/1.15 |
| 2012/0075667 | A1* | 3/2012 | Kamata | H04L 67/1097 358/1.15 |
| 2012/0194863 | A1* | 8/2012 | Oshima | G06F 3/1204 358/1.15 |
| 2012/0194864 | A1* | 8/2012 | Oshima | G06F 3/1204 358/1.15 |
| 2012/0210112 | A1* | 8/2012 | Suganami | H04L 12/12 713/2 |
| 2012/0224206 | A1* | 9/2012 | Takahashi | G06F 3/1229 358/1.13 |
| 2012/0246502 | A1* | 9/2012 | Koga | H04N 1/00896 713/323 |
| 2013/0057883 | A1* | 3/2013 | Ohshima | H04N 1/00891 358/1.9 |

FOREIGN PATENT DOCUMENTS

| | | | | |
|---|---|---|---|---|
| JP | 2005115478 | A | * | 4/2005 |
| JP | 2005196741 | A | * | 7/2005 |
| JP | 2006040012 | A | * | 2/2006 |
| JP | 2007-43665 | A | | 2/2007 |
| JP | 2007043665 | A | * | 2/2007 |
| JP | 2007301765 | A | | 11/2007 |
| JP | 2008087353 | A | * | 4/2008 |
| JP | 2008181402 | A | | 8/2008 |
| JP | 2008211761 | A | | 9/2008 |
| JP | 2013242613 | A | * | 12/2013 |

OTHER PUBLICATIONS

Office Action issued in corresponding Japanese Patent Application No. 2011-089537, dated Feb. 13, 2015.
Office Action issued in Japanese Appln. No. 2015-237969, mailed Dec. 5, 2016.

* cited by examiner

IMAGE FORMING APPARATUS WITH CONTROLLED ACTIVATION BASED ON PORT NUMBER AND CONTROL METHOD THEREOF

BACKGROUND OF THE INVENTION

Field of the Invention

The present invention relates to an image forming apparatus equipped with a sleep function and for forming an image using an image forming unit, and to a control method thereof.

Description of the Related Art

Multi-function peripherals equipped with functions such as a copy function, a print function, a FAX function and a network function are known. Starting up such a multi-function peripheral begins with activation processing in response to the device being powered on, and subsequently the device starts up in a normal mode and enters a standby state. In general, a copy operation and a print operation are performed in the standby state. In order to perform power saving control, multi-function peripherals are further equipped with a sleep mode that consumes less power than in the standby state.

Multi-function peripherals (image forming apparatuses) include a controller unit for executing various function and performing power controls and an engine unit for executing output control, and are configured so that these units are activated independently. Therefore, return processing from the sleep mode is performed on the basis of data transferred via a network, for example. In this processing, since there is a time difference between a response time to a wake-up instruction from the network and a startup time of the controller unit, activation of the engine unit is started after the startup of the controller unit. As a result, it takes a long time to start up a multi-function peripheral when returning from the sleep mode. To resolve this problem, Japanese Patent Laid-Open No. 2007-43665 proposes initialization processing of an image forming apparatus when a trigger for returning from a power saving mode to the normal mode arises.

In this conventional technique, however, during the initialization processing of the image forming apparatus, a controller of the engine unit for output control determines whether or not the engine unit is to perform the initialization, and therefore it takes time to activate the apparatus.

Additionally, under such circumstances, conventional image forming apparatuses are capable of receiving several types of jobs at a network port, including print processing, inquiries about apparatus information, and storage. These jobs are received at a single port, and the controller unit needs processing time to determine whether or not the received jobs require returning from the sleep state. Therefore, such an image forming apparatus has to start up both the controller unit and the engine unit to return from the sleep state, thus requiring a longer activation time.

SUMMARY OF THE INVENTION

An aspect of the present invention is to eliminate the above-mentioned problems with conventional technology.

It is a feature of the present invention to provide a technique of shortening an activation time until an image forming unit is started up when returning from a sleep state, so as to shorten the activation time as a whole.

According to an aspect of the present invention, there is provided an image forming apparatus equipped with a sleep function and for forming an image using an image forming unit, comprising: a control unit configured to control the image forming unit; a discrimination unit configured to, when a job is received in a sleep state, discriminate a port number of the received job; a determination unit configured to determine whether or not initialization processing of the image forming unit is necessary, based on the port number discriminated by the discrimination unit; and an activation control unit configured to, in a case that the determination unit determines that initialization processing of the image forming unit is necessary, start initialization processing of the image forming unit and thereafter control the control unit to start processing of the job.

According to an aspect of the present invention, there is provided a method for controlling an image forming apparatus including a controller unit and an image forming unit and equipped with a sleep function, comprising: a discrimination step of, when a job is received in a sleep state, discriminating a port number of the received job; a determination step of determining whether or not initialization processing of the image forming unit is necessary, based on the port number discriminated in the discrimination step; and an activation control step of, in a case that it is determined in the determination step that initialization processing of the image forming unit is necessary, starting initialization processing of the image forming unit and thereafter controlling the controller unit to start processing of the job.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments is not intended to limit the claims of the present invention, and that not all of the combinations of the aspects that are described according to the following embodiments are necessarily required with respect to the means to solve the problems according to the present invention.

The First Embodiment

Figure 1:
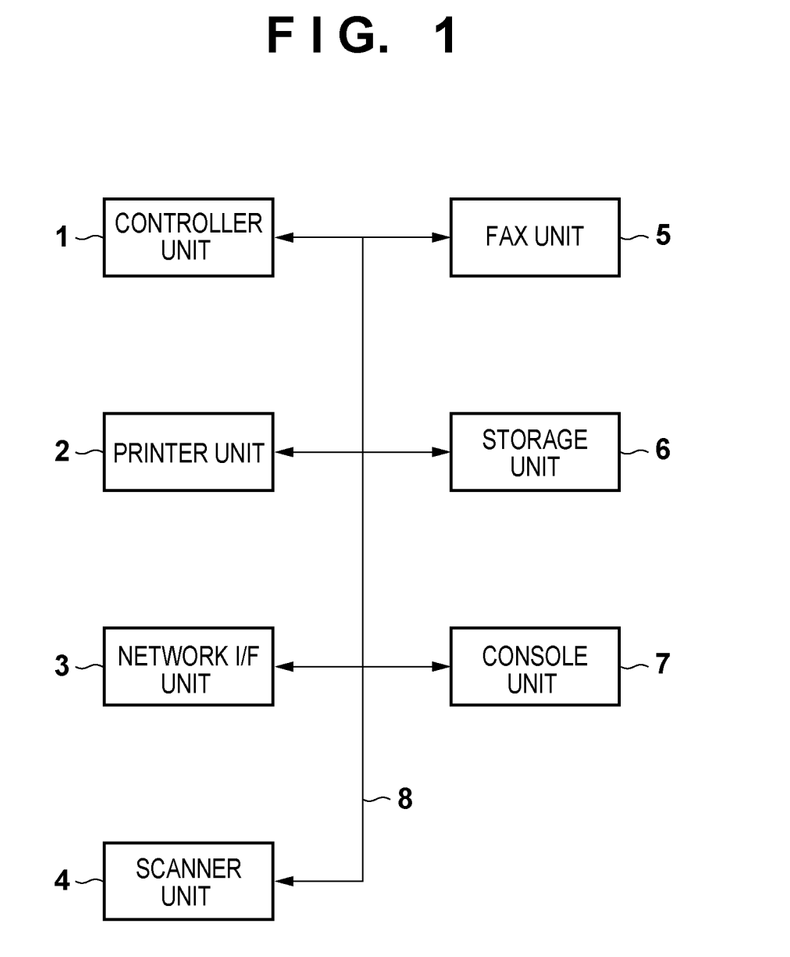
FIG. 1 is a block diagram illustrating the configuration of a multi-function peripheral (image forming apparatus) according to a first embodiment of the present invention.

FIG. 1 is a block diagram illustrating the configuration of a multi-function peripheral (image forming apparatus) according to the first embodiment of the present invention.

The image forming apparatus exemplified in the following is equipped with functions such as a copy function, a print function, a FAX function and a network function. In the image forming apparatus, a controller unit 1 controls a scanner unit 4 and processes image data read by the scanner unit 4. The controller unit 1 further controls a printer unit 2 to perform printing in accordance with image data read by the scanner unit 4 or print data from a network received via a network interface unit 3. The printer unit 2 includes a printer engine (image forming unit) and executes print processing under the control of the controller unit 1. The network interface unit 3 controls transmission/reception of data to/from an external device such as a client PC via the network. A FAX unit 5 transmits/receives facsimile data to/from a Facsimile device connected via a facsimile line under the control of the controller unit 1. A storage unit 6 is provided with a hard disk drive (HDD), for example, and is used to store various types of data such as image data read by the scanner unit 4 and print data. The storage unit 6 has installed thereon a control program that is executed by a CPU 211 (FIG. 2) of the controller unit 1, and the control program is expanded in a RAM 213 (FIG. 2) of the controller unit 1 and executed. A console unit 7 includes an unshown console panel (touch panel) for displaying various types of information and inputting instructions from a user under the control of the controller unit 1. An internal bus 8 is a system bus for transmitting/receiving data signals and control signals from the controller unit 1 with respect to these units.

Figure 2:
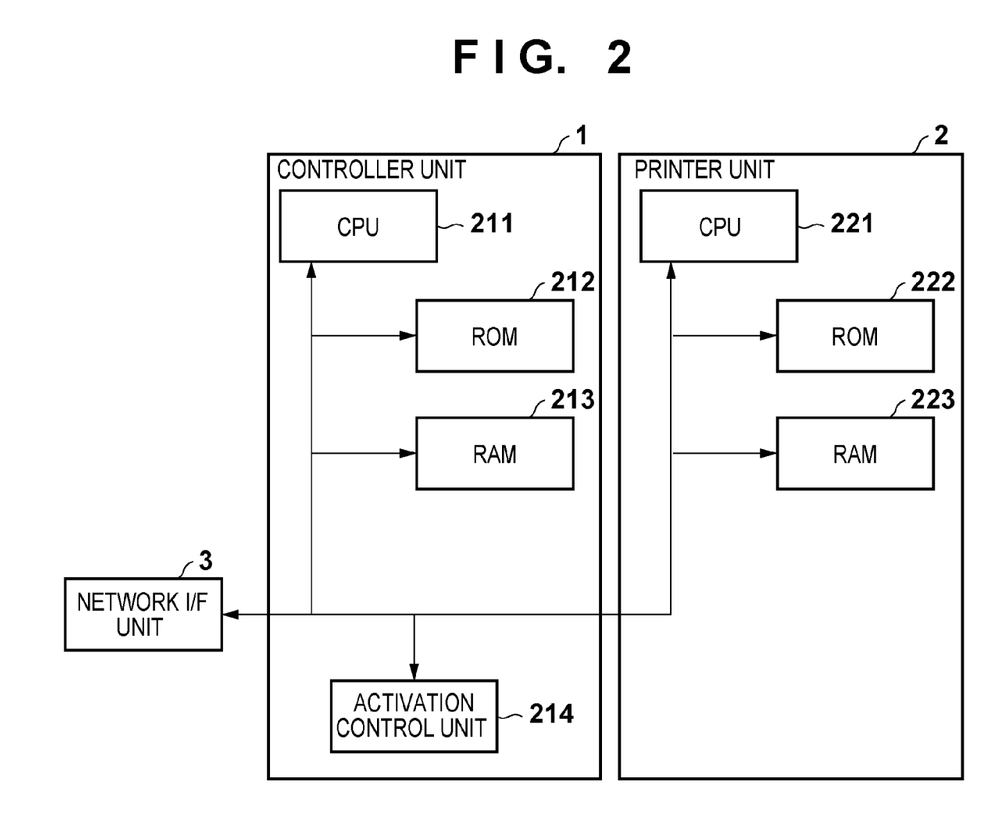
FIG. 2 is a block diagram for describing a control system of a controller unit and a printer unit of the image forming apparatus according to the first embodiment.

FIG. 2 is a block diagram for describing a control system of the controller unit 1 and the printer unit 2 of the image forming apparatus according to the first embodiment.

The CPU 211 controls the controller unit 1. A ROM 212 stores a BIOS program executed by the CPU 211 during activation of the controller unit 1. The RAM 213 provides a program area where an application program and an OS read out from the storage unit 6 in accordance with the BIOS program are expanded and a work memory for storing various types of data during program execution by the CPU 211. In order to control activation of the controller unit 1, the controller unit 1 is further provided with an activation control unit 214.

A CPU 221 controls the printer unit 2. A ROM 222 stores a program executed by the CPU 221. A RAM 223 provides a work memory for storing various types of data during program execution by the CPU 221.

Figure 3:
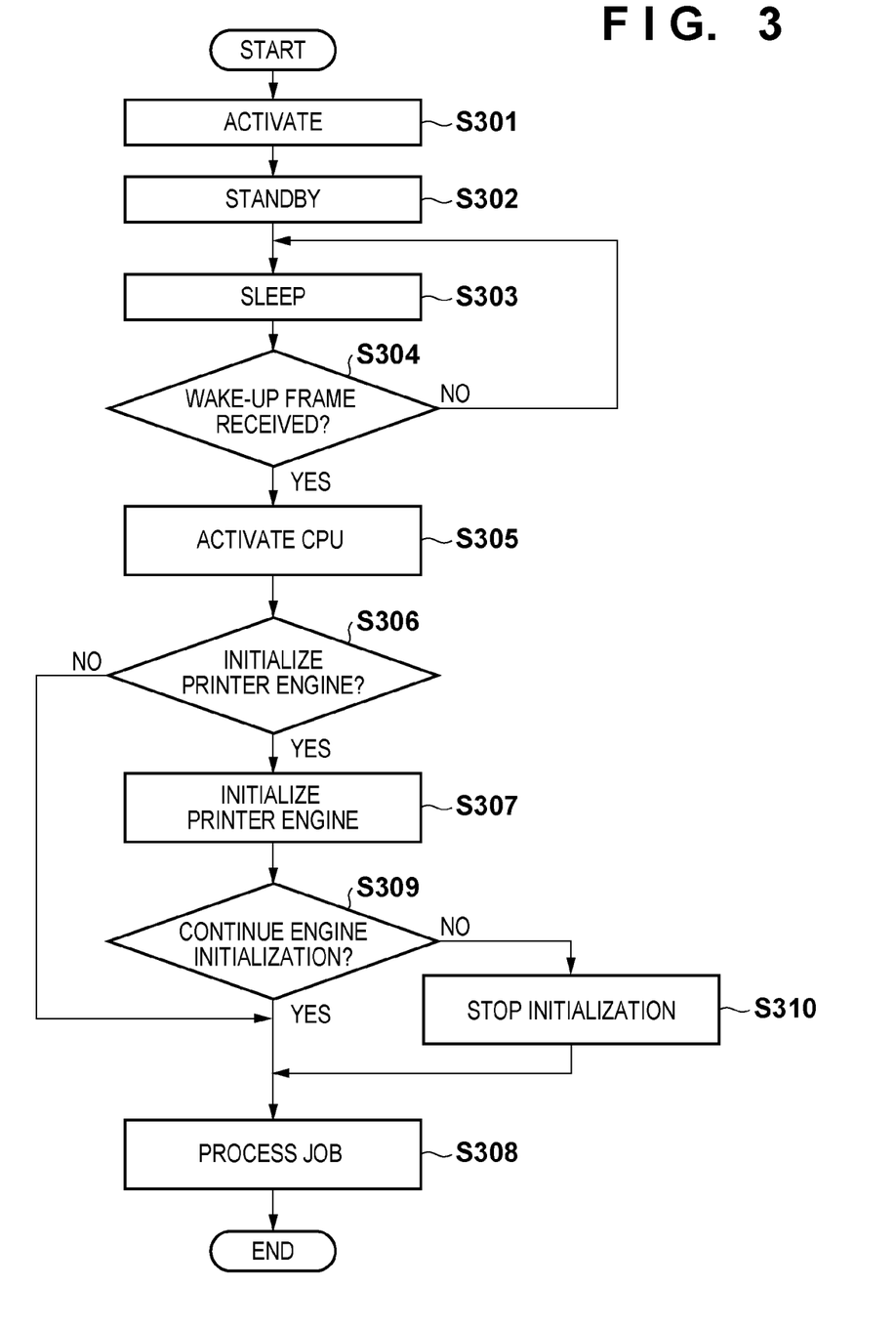
FIG. 3 is a flowchart for describing control processing by the image forming apparatus according to the first through the third embodiments.

FIG. 3 is a flowchart for describing control processing by an image forming apparatus according to the first embodiment. The following describes the startup procedure in the present image forming apparatus.

This processing is started in response to a power supply switch of the image forming apparatus being turned on. Firstly in step S301, activation of the main body is started. In this example, when a power supply of the controller unit 1 is powered on, the CPU 211 reads out the BIOS program stored in the ROM 212, and performs system initialization. After completion of the activation by the BIOS, an OS program is read out from the storage unit 6, and OS activation is performed. When this processing is completed, activation of the image forming apparatus is completed. Then in step S302, the image forming apparatus shifts to a standby state as a normal state for accepting an operation of the image forming apparatus. In the standby state for accepting an operation or a job, processing can be performed immediately upon arrival of a job, so power consumption is high. It is not preferable to leave the image forming apparatus in such a high power consumption mode during a waiting time for the reception of an operation or a job. Therefore, the image forming apparatus has a sleep function of shifting to a sleep state with lower power consumption after the elapse of a certain time period without an event occurring (steps S303, S304). When an operation or a job is received in the sleep state, the image forming apparatus shifts to the standby state again. In this way, power consumption of the image forming apparatus is efficiently controlled. The following describes the processing when the image forming apparatus in the sleep state receives a job via the network.

In a low power consumption state in which the image forming apparatus is in a sleep state, power is supplied only to the RAM 213 and the activation control unit 214 of the controller unit 1, the network interface unit 3, the FAX unit 5 and LEDs (not illustrated) of the console unit 7. Therefore, the apparatus in the sleep state consumes much lower power than in the standby state. The sleep state is a preparatory state for receiving an operation or a job of the image forming apparatus. The following describes an operation when an external PC, for example, issues a print job to the image forming apparatus in the sleep state via the network.

The network interface unit 3 constantly monitors data received via the network, and especially in the sleep state monitors wake-up frame data for transitioning the apparatus to the standby state. A print job received from an external PC via the network includes this wake-up frame data. Therefore, when a PC on the network transmits a print job to the image forming apparatus, the network interface unit 3 detects the wake-up frame data included in the print job.

In step S304, when the network interface unit 3 detects the wake-up frame data, the activation control unit 214 of the controller unit 1 is informed of such. In step S305, the activation control unit 214 thereby performs processing to turn the power supply of the controller unit 1 on and activates the CPU 211. Next, the procedure proceeds to step S306 where the activation control unit 214 of the controller unit 1 subsequently determines whether or not to initialize the printer engine of the printer unit 2. The following describes determination processing as to whether or not to perform initialization using a port number in this job processing.

A port number is a number that allows the image forming apparatus connected to an external PC via the network to specify the processing of a job, and is used in combination with an IP address used in a communication protocol. To this end, a job with an IP address and a port number designated therefor is transmitted from an external PC to the image forming apparatus when the external PC causes the image forming apparatus to execute the job.

When a print job is received, the network interface unit detects a port number included in the print job and activates the CPU 211 of the controller unit 1 in step S305. In step S306, the activation control unit 214 of the controller unit 1 determines based on the detected port number that initialization of the printer engine is necessary. Since the job transmitted to the image forming apparatus this time is a print job, the activation control unit 214 determines that the initialization of the printer engine is necessary. If the activation control unit 214 determines that the initialization of the printer engine is not necessary, the procedure proceeds from step S306 to step S308, and the received job is executed.

In step S306 when the activation control unit 214 determines that initialization of the printer engine is necessary, the procedure proceeds to step S307, and initialization processing of the printer engine is performed as follows.

Firstly the activation control unit 214 instructs the CPU 221 of the printer unit 2 to execute the initialization processing. Thereby the CPU 221 of the printer unit 2 executes the initialization processing of the printer engine in accordance with an initialization processing instruction of the printer engine and prepares for printing. In this way when preparation of the printer unit 2 is completed, the controller unit 1 is notified of printer preparation completion. Next, the procedure proceeds to step S309, where the activation control unit 214 of the controller unit 1 determines whether or not to continue the initialization processing (continue the preparation for printing) of the printer engine of the printer unit 2. When it is determined that the preparation for printing is to be continued, the procedure proceeds to step S308 and the print job is processed. In step S308, the controller unit 1 expands the print job into print data, and the print data is initially stored in the storage unit 6. Then, the print data is transmitted to the printer unit 2 and printing is executed. When it is determined in step S309 that continuation processing for printing preparation is not necessary, the procedure proceeds to step S310, where the initialization processing is stopped, before proceeding to step S308.

In this way, when the image forming apparatus in a sleep state receives a print job, the port number of the received print job is analyzed, enabling the image forming apparatus to be activated quickly to perform print processing.

The Second Embodiment

The following describes an operation of a storage job for storing data in the storage unit 6, with reference to the flowchart of FIG. 3. The following describes an operation that does not involve print processing. In this case, the processing up to step S303 is performed similarly to the print job processing in the first embodiment. Since the configuration of the image forming apparatus according to the second embodiment is similar to that illustrated in FIGS. 1 and 2 of the first embodiment, the descriptions thereof are omitted.

In step S304 the network interface unit 3 constantly monitors data imported to the image forming apparatus, and in this case monitors whether or not wake-up frame data is received in the sleep state. A storage job for executing storage of data to the storage unit 6 of the image forming apparatus from an external PC includes wake-up frame data. Therefore, when a storage job is received, the network interface unit 3 detects the wake-up frame data included in the storage job.

When the wake-up frame data is detected, the network interface unit 3 informs the activation control unit 214 of the controller unit 1, and the activation control unit 214 performs processing to turn the power supply of the controller unit 1 on and activates the CPU 211 (step S305). Then, the network interface unit 3 analyzes the port number of the storage job and determines whether or not to perform initialization of the printer engine.

In this case, since a storage job is received, the activation control unit 214 discriminates that initialization of the printer engine is not necessary, and the procedure proceeds from S306 to S308, where the storage job is processed. For execution of the data storage job, the controller unit 1 expands the data into image data and stores the expanded image data in the storage unit 6 to complete the storage processing.

In this way, when the image forming apparatus in a sleep state receives a storage job, the port number of the received storage job is analyzed, enabling the image forming apparatus to be activated quickly and the storage job to be processed without starting up the printer unit 2.

The Third Embodiment

The following describes an operation to check a state of the image forming apparatus, with reference to the flowchart of FIG. 3. The following describes an operation in the case where, following the reception of wake-up frame data, it cannot be determined whether or not the data involves print processing. In this case, the processing to step S303 is performed similarly to the operation when a print job is received in the first embodiment. Since the configuration of the image forming apparatus according to the third embodiment is similar to that illustrated in FIGS. 1 and 2 of the first embodiment, the descriptions thereof are omitted.

In step S304 the network interface unit 3 of the image forming apparatus constantly monitors data imported to the image forming apparatus, and monitors whether or not wake-up frame data is received in the sleep state. An inquiry from an external PC about an operation for checking the state of the image forming apparatus includes wake-up frame data. Therefore, when an inquiry about the state of the image forming apparatus is received, the network interface unit 3 detects the wake-up frame data.

When the wake-up frame data is detected, the network interface unit 3 informs the activation control unit 214 of the controller unit 1. In step S305, the network interface unit 3 detects a port number included in the received job and activates the CPU 211 of the controller unit 1. Then, network interface unit 3 analyzes the port number of the received job and determines whether or not to perform initialization of the printer engine of the printer unit 2. In this case, since the job transmitted to the image forming apparatus is an inquiry about the state of the image forming apparatus, the activation control unit 214 of the controller unit 1 cannot discriminate whether initialization of the printer engine is necessary, and so the activation control unit 214 determines for the meantime that initialization of the printer engine is necessary.

In step S306 when the activation control unit 214 discriminates that initialization of the printer engine is necessary, the procedure proceeds to step S307, and initialization processing of the printer engine is performed as follows.

The activation control unit 214 instructs the CPU 221 of the printer unit 2 to execute the initialization processing. Thereby the CPU 221 of the printer unit 2 executes the initialization processing of the printer engine and prepares for printing. Thereafter the procedure proceeds to step S309, where the activation control unit 214 determines whether or not to continue the initialization processing of the printer engine. In the case of a job such as this for checking the state of the image forming apparatus, this determination involves checking whether or not initialization of the printer engine is necessary in subsequent processing resulting from the job, and when it is determined that initialization is not necessary, the initialization of the printer engine is stopped in step S310. On the other hand, when the activation control unit 214 determines that initialization of the printer engine is to be executed in subsequent processing of the job, the procedure proceeds to step S308, where the initialization processing of the printer engine is continued and the operation of the printer unit 2 is prepared. In this way, when the preparation of the printer unit 2 is completed, the controller unit 1 is notified of the printer preparation completion. Thereafter the job is processed.

When it is determined, in the determination of step S306 as to whether or not to perform the initialization processing of the printer engine, that the initialization processing is not necessary, the procedure proceeds to step S310, where the initialization processing of the printer engine is stopped. Thereafter the job is processed to complete the processing.

In this way, when an operation checking job for checking the state of the image forming apparatus is received, the image forming apparatus can be activated quickly on the basis of the determination according to analysis of the port number of the operation checking job. In this case, since the necessity of initialization of the printer engine cannot be determined only on the basis of the operation checking job, the printer unit 2 is started up, and thereafter the job is analyzed in detail and it is determined whether or not initialization of the printer engine is necessary. In this way, the image forming apparatus can be activated quickly.

Determination of wake-up frame data by the image forming apparatus is described below, with reference to the flowchart of FIG. 3. When the network interface unit 3 receives a job, the image forming apparatus can process a plurality of triggers as discussed above. This will now be discussed in the case where a job other than these is received. When the image forming apparatus according to the present embodiment is in the sleep state of step S303, the network interface unit 3, in the determination of the subsequent step S304, determines that the job does not include wake-up frame data, and returns to step S303 in which the image forming apparatus is in the sleep state. In this way, in job reception by the network interface unit 3, the plurality of triggers discussed above can be processed.

The Fourth Embodiment

The following describes a method for receiving a wake-up packet according to the fourth embodiment. Since the configuration of the image forming apparatus according to the fourth embodiment is similar to that illustrated in FIGS. 1 and 2 of the first embodiment, the descriptions thereof are omitted.

Figure 4:
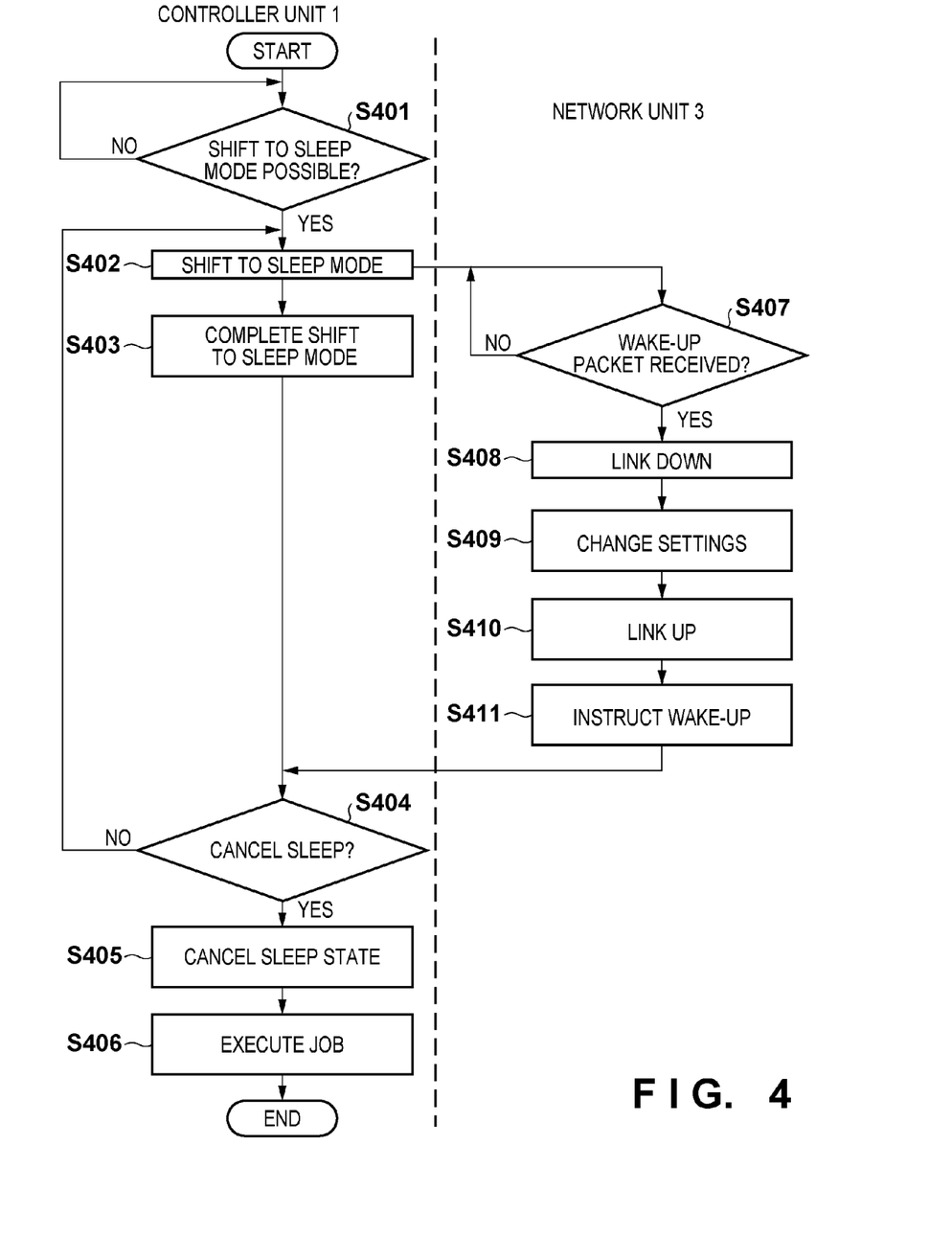
FIG. 4 is a flowchart for describing control processing by an image forming apparatus according to a fourth embodiment.

FIG. 4 is a flowchart for describing control processing by an image forming apparatus according to the fourth embodiment. This flowchart illustrates the procedure of wake-up packet processing for instructing shifting to a sleep state and returning from a sleep state in the image forming apparatus.

Firstly in step S401 the controller unit 1 monitors whether or not conditions are right for shifting to the sleep state and performs the determination as to whether or not it is possible to shift to the sleep state as needed. When the conditions are right for shifting to the sleep state, the procedure proceeds to step S402, and shift processing to the sleep state is performed. Specifically, power saving control such as stopping power supply to a display unit of the console unit 7 and stopping power supply to the scanner unit 4 and the printer unit 2 of the image forming apparatus is performed.

Next, the procedure proceeds to step S403, where the controller unit 1 instructs the network interface unit 3 to shift to a sleep state, shifts the RAM 213 to a low power consumption mode and stops process by the CPU 211, thus completing the shift to the sleep state.

After shifting to the sleep state, in step S404, the apparatus maintains the low power consumption mode until a trigger event for returning from the sleep state is received.

In this sleep state, the network interface unit 3 receives a packet addressed to the image forming apparatus, and in step S407 determines whether or not the packet requires returning from the sleep state. Specifically, the packet received at the network interface unit 3 is stored in an unshown RAM in the network interface unit 3, and an unshown CPU in the network interface unit 3 determines whether or not the received packet is a wake-up packet.

When it is determined in step S407 that the apparatus has received a wake-up packet, the procedure proceeds to step S408, where link down is performed to change settings. In such a link down state, communication at a data link layer serving as a second layer of communication cannot be performed. Then, the procedure proceeds to step S409, where settings are changed to a wake-up mode as instructed via the network, and in step S410 the apparatus waits for the completion of link up.

Thereafter the procedure proceeds to step S411, where the network interface unit 3 notifies an interrupt to the controller unit 1 via the internal bus 8 and issues a wake-up instruction to the controller unit 1.

The controller unit 1, having thereby received the wake-up instruction as an interrupt from the network interface unit 3 in step S404, proceeds to step S405 and cancels the sleep state. Specifically, when an interrupt serving as wake-up instruction is received from the network interface unit 3, an unshown power control circuit of the image forming apparatus starts energizing the controller unit 1 of the image forming apparatus. As a result, the CPU 211 resumes operation. Once the CPU 211 resumes operation, the RAM 213 returns from the low power consumption mode to the normal mode, and the activation control unit 214 performs sleep return processing. Then, in step S406 the image forming apparatus executes the received job (print processing in the case of a print job).

As described above, according to the fourth embodiment, it is also possible to quickly activate the image forming apparatus and perform processing when a wake-up packet is received.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-089537, filed Apr. 13, 2011, which is hereby incorporated by reference herein in its entirety.

What is claimed is:

1. A printing apparatus, comprising:
   a controller that controls the printing apparatus;
   a printer unit that forms an image on a sheet;
   a print controller that drives the printer unit in accordance with a control of the controller;
   a network interface that receives data from an external device via a network; and
   an activation control circuit that performs control so that an electric power is supplied to the controller, the print controller and the printer unit, and instructs the print controller to execute an initialization processing of the printer unit, based on wake request data for designating a predetermined port number being received by the network interface during a sleep state in which power supply to the controller, the print controller and the printer unit is stopped or restricted.

2. The printing apparatus according to claim 1, wherein the wake request data is a print job.

3. The printing apparatus according to claim 1, wherein the activation control unit performs control so that an electric power is supplied to the controller, the print controller and the printer unit, and does not instruct the printer controller to execute the initialization processing of the printer unit, based on a wake request data for not designating the predetermined port number being received by the network interface during the sleep state.

4. The printing apparatus according to claim 1, the initialization processing is a preparation processing for the printer unit.

5. The printing apparatus according to claim 1, wherein the network interface determines whether or not the received data is the wake request data.

6. The printing apparatus according to claim 5, wherein the network interface determines that the received data is the wake request data in a case that the received data includes wake-up frame data.

7. The printing apparatus according to claim 5, wherein the network interface notifies the active control circuit that the network interface receives the wake request data based on having determined that the received data is the wake request data.

8. The printing apparatus according to claim 7, wherein the active control circuit controls that the electric power is supplied to the controller, the print controller and the printer unit based on a notification from the network interface.

9. The printing apparatus according to claim 1, wherein the network interface determines whether or not a port number of the received data is the predetermined port number.

10. The printing apparatus according to claim 9, wherein the network interface notifies the active control circuit based on having determined that the port number of the received data is the predetermined port number.

11. The printing apparatus according to claim 10, wherein the activation control circuit instructs the printer controller to execute the initialization processing of the printer unit based on a notification from the network interface.

12. The printing apparatus according to claim 1, wherein the activation control circuit and the printer controller are connected as being capable of communicating.

13. The printing apparatus according to claim 1, wherein the printer controller notifies the controller when the initialization processing of the printer unit is completed.

14. A method of controlling a printing apparatus for printing an image on a sheet using a printer unit, the apparatus comprises a controller that controls the printing apparatus, a print controller that drives the printer unit, an activation control circuit that performs control so that an electric power is supplied to the controller, the printer unit and the print controller and a network interface that receives data from an external device, the method comprising:

supplying the electric power to the controller, the printer unit and the print controller based on receiving wake request data for designating a predetermined port number during a sleep state in which power supply to the controller, the printer unit and the print controller is stopped or restricted.

* * * * *